United States Patent
Colombani

Patent Number: 5,292,468
Date of Patent: Mar. 8, 1994

[54] PROCESS FOR THE PRODUCTION OF NON-STICKY THERMOFUSIBLE AUTOADHESIVE SHAPES

[75] Inventor: Jean J. Colombani, Auffargis, France

[73] Assignee: Ceca S.A., Courbevoie, France

[21] Appl. No.: 678,839

[22] Filed: Apr. 1, 1991

[30] Foreign Application Priority Data

Apr. 2, 1990 [FR] France .................. 9004154

[51] Int. Cl.$^5$ ............................................. B29C 39/12
[52] U.S. Cl. ................................ 264/130; 156/167; 156/244.11; 264/255; 264/264; 264/309; 427/208.2; 427/208.4
[58] Field of Search .............. 264/255, 264, 309, 130, 264/39, 232, 338, 555; 427/133, 207.1, 208.2, 208.4; 156/167, 444, 244.11

[56] References Cited

U.S. PATENT DOCUMENTS

| | | | |
|---|---|---|---|
| 3,911,173 | 10/1975 | Sprague, Jr. | 427/207.1 |
| 4,748,796 | 6/1988 | Viel | 264/255 |
| 4,755,245 | 7/1988 | Viel | 264/255 |
| 4,815,660 | 3/1989 | Boger | 427/286 |
| 4,844,003 | 7/1989 | Slautterback et al. | 427/208.2 |
| 4,898,634 | 2/1990 | Keuchel | 156/167 |
| 4,911,956 | 3/1990 | Gabryszewski et al. | 427/207.1 |
| 5,026,450 | 6/1991 | Cucuzza et al. | 156/244.11 |

FOREIGN PATENT DOCUMENTS

| | | |
|---|---|---|
| 84 03457 | 9/1984 | France . |
| 88 03468 | 9/1984 | France . |
| 2601616 | 1/1988 | France . |
| 88 10154 | 12/1989 | France . |

Primary Examiner—Jan H. Silbaugh
Assistant Examiner—Brian J. Eastley

[57] ABSTRACT

A process for the manufacture of a hot-melt, pressure-sensitive adhesive substance with surfces that are not sticky or self-adhesive, which includes casting such a substance in a mold that has been previously coated with a protective web created by spinning a hot-melt, non-pressure-sensitive adhesive and of protecting the surface of the casting with a similar web. For this purpose, fiberization nozzles are advantageously employed. These protective webs are very resistant and, since they participate in the solidity of the block, they make possible the flexible packaging of adhesives with a low mass mechanical strength.

4 Claims, 3 Drawing Sheets

PROCESS FOR THE PRODUCTION OF NON-STICKY THERMOFUSIBLE AUTOADHESIVE SHAPES

BACKGROUND OF THE INVENTION

The present invention pertains to an improved process for the packaging of hot-melt, pressure-sensitive adhesives in the form of blocks with surfaces that are neither tacky nor sticky.

It can be briefly summarized that pressure-sensitive adhesives are substances that can adhere to various supports and to themselves upon simple contact under a pressure of varying strength. They are substances or mixtures of substances endowed with specific viscoelastic properties, which are thoroughly discussed by S. G. Chu in Viscoelastic Properties of Pressure-Sensitive Adhesives, Handbook of Pressure-Sensitive Adhesive Technology, Van Nostrand Reinhold Co. They are most frequently compositions based on polymers or elastomers, e.g., natural rubber, SBR, SIS, SBS rubbers, polychloroprene, nitrile rubber, chlorinated rubber, butyl rubbers, ethylene-vinly acetate copolymers, polyertheramides, polymers or copolymers of alpha-olefins, and various ingredients that are well known by the expert in the field, which include tackifying resins, waxes, plasticizers and other ordinary formulation ingredients.

These compositions are valued for their dual specific characteristics of exhibiting a strong, instantaneous adhesive power in the melted state (referred to as tack) and of preserving a surface adhesive power upon their return to the solidified state. This latter behaviour is obviously disadvantageous for the handling and storage of blocks, cakes, slugs and other individual forms of packaging these pressure-sensitive adhesives.

Several procedures are known for resolving this drawback. First of all, there are the widespread solutions that are comprised of using removable, disposable packaging for blocks of pressure-sensitive adhesives with foils or films made of a material on which the adhesive property of the pressure-sensitive adhesive does not develop; such as packaging of individual preformed blocks with foils, pouring the melted pressure-sensitive adhesive into boxes, and pouring the pressure-sensitive adhesive into resuable molds that have first been covered with a film made of such a material. They all have all of the drawbacks of disposable packaging systems, and the drawback of handling blocks of pressure-sensitive adhesives that after unpacking retain the drawback of blocks with a sticky surface.

Other procedures employ a protective layer made of a material that upon use undergoes the same fate as the pressure-sensitive adhesives, the most valuable being the procedures in which the pressure-sensitive adhesive is poured into a mold that has previously been primed with such a material. Thus, there is known the procedure of pouring the pressure-sensitive adhesive into molds that have previously been powdered, the powdered envelope of which is obtained and maintained in a coherent state by electrostatic means, described in the French patent No. 2,541,930. There is also known the procedure of pouring the pressure-sensitive adhesive into a mold covered with a web of a hot-melt but not pressure-sensitive adhesive described in the French patent application No. 2,601,616. The first procedure has the problems associated with implementation of an electrostatic procedure which, in addition, does not act to protect the casting surface. The second procedure has the problems of eliminating the burrs on the finished blocks of pressure-sensitive adhesives and the fouling of the machines by the filaments that escape during formation of the hot-melt adhesive web.

SUMMARY OF THE INVENTION

Applicant has now invented a process that resolves these drawbacks and which is comprised of pouring hot-melt, pressure-sensitive adhesive material into a mold that has been previously covered with a fine cloth constituted of a spun hot-melt, non-pressure-sensitive adhesive. In order to obtain this result, the hot-melt, non-pressure-sensitive adhesive material is delivered in the melted state via a nozzle which, unlike the nozzles employed until now for this application, does not break up the sprayed material into multiple microjets but rather distributes it in the form of a continuous monofilament.

The invention thus comprises a process for the manufacture by molding of blocks of hot-melt, pressure-sensitive adhesive sustance with surfaces that are not tacky or self-adhesive under light pressure, which comprises the pouring of said pressure-sensitive adhesive substance into a mold, the walls of which have previously been coated with a web of a hot-melt, non-pressure-sensitive adhesive substance and the subsequent protection of the molding surface remaining free by means of a web also made of a hot-melt, non-pressure-sensitive adhesive, and the characteristic of which is that the hot-melt protective webs are obtained by spinning the hot-melt, non-pressure-sensitive adhesive substance.

DETAILED DESCRIPTION

Figure 1:
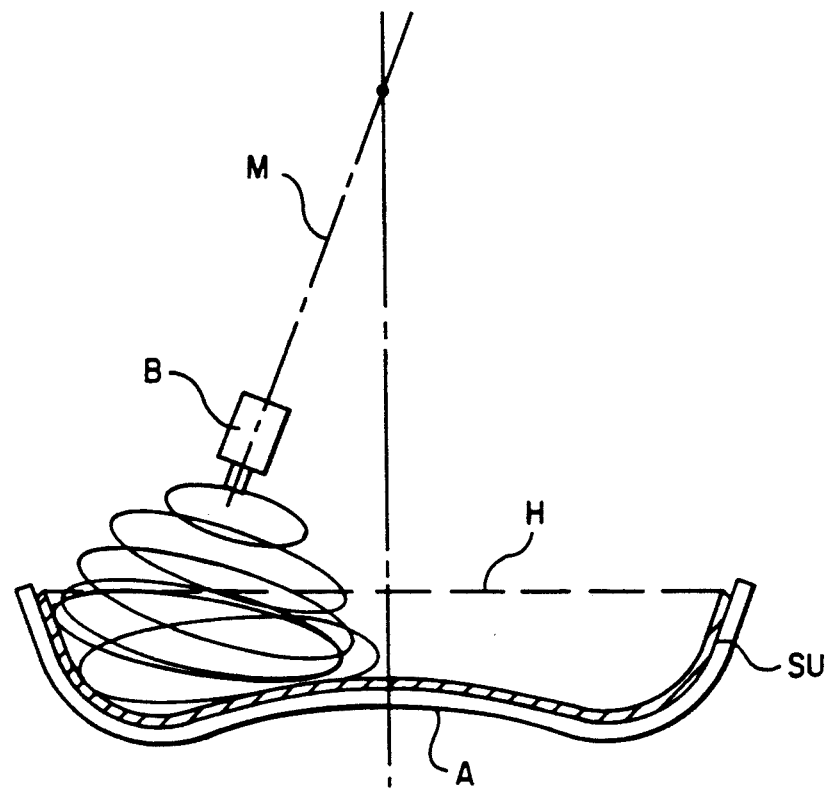
FIG. 1 is a sectional side view of a mold being coated with a web in accord the the present invention.

Improved spinning nozzles are preferred for the implementation of the invention. These are nozzles, known under the name of fiberization nozzles, the structure of which is such that they discharge a melted monofilament material animated by a circular movement. They are described, for example, in European Patent No. 224,855 (Meltex Verbindunges).

The spinning nozzle moves over the mold surface, following a wave such that the mold is coated with an epicycloidal rosette of hot-melt, non-pressure-sensitive adhesive material, and after complete cooling of which the hot-melt, pressure-sensitive adhesive substance is poured into the mold. The free surface of the molded block, cooled in its mold, is then in turn protected according to the same principle. It is then possible to unmold the block which is totally without stickiness, and which can then be packaged and handled without particular precautions.

The particular composition of the protective envelopes in accordance with the invention offers numerous advantages. First, that of a very high precision within the geometric limits of this envelope. Thus, it is possible to very precisely delimit the coated part of the mold and make it coincide with the level of filling that has been selected in advance. With the protection procedure involving coating by spraying hot-melt, non-pressure-sensitive adhesive, the protection by the hot-melt, non-sticking adhesive greatly exceeds the filling limits; the raw cast block has double-thickness burrs (the burrs from the coating of the mold and the burrs from the post-protection of the free surface), which it is difficult or expensive (for example, by means of cryogenic deburring) to remove in an automated industrial manner. The system in accordance with the invention radically eliminates this problem of deburring the blocks. In addition, it also radically eliminates the problem caused by the inevitable run-over of the spraying outside of the molds and the necessity of their systematic cleaning, without which the soiling of the manufacturing tool will end up by impeding its operation.

The ability of selection of the filling level is a substantial advantage in relation to the protection systems involving electrostatic powdering. In these systems, the filling of the molds is imposed at a constant level, since the sticky free surface of the blocks is eliminated by attaching them in pairs, by folding the two molds on a common hinge. This obviously means that the hot-melt, pressure-sensitive adhesive will seep into each of the molds: the result is that, depending on the qualities of pressure-sensitive adhesive, the density of the compositions varies, the weight of the blocks is not constant, which is a considerable disadvantage both for marketing and for use of the blocks in feeding automated glueing systems.

The procedure in accordance with the invention also provides an elegant solution to the problem of unmolding the blocks during their manufacture. The material with which the mold is coated is selected not only to ensure a nonsticky quality of the block of hot-melt adhesive, but also in part for its quality as an unmolding agent. However, no matter what might be this ability to facilitate unmolding, the material itself of the hot-melt adhesive is not lacking in a certain flexibility and the extraction of the block from its mold is sometimes made difficult because the mold exercises a suction force on a material that responds with a certain deformation to any attempt at extraction. The tenacity of the surface web created in accordance with the invention, particularly that of the epicycloidal rosettes of the molding surface, allows extraction of the blocks by suction, a system which is inapplicable to the blocks molded in accordance with the prior art which do not resist the surface tearing.

This tenacity of the protective, spun layer also participates in the reinforcement of the mass of the block, which can therefore be comprised of very elastic pressure-sensitive adhesive material, which is deformed relatively little by handling. In addition, the spinning of the protective envelope allows the use of a very precise amount of the protective material, and its very homogeneous distribution. It is estimated that the relative weight of this envelope should not exceed 1.5% of the mass of the block. The system in accordance with the invention can therefore conserve the coating material. That which is saved can be usefully employed in reinforcing the stitch. It is thereby possible to make blocks with formulations of very deformable material, which until now have been inaccessible in flexible packaging.

A secondary advantage, which is not negligible, is associated with the precision of the coating process. It makes it possible to mark various qualities of hot-melt adhesive by changing the color of the non-pressure-sensitive hot-melt adhesive used in the different phases of the formation of the protective envelope.

The invention will be further described in connection with the following examples and the drawings, which examples are set forth for purposes of further illustration only.

EXAMPLE 1

Described below is a particular process for manufacturing blocks of hot-melt, pressure-sensitive adhesives in accordance with the invention. The figures of the drawing will facilitate following the description of the example.

Figure 2:
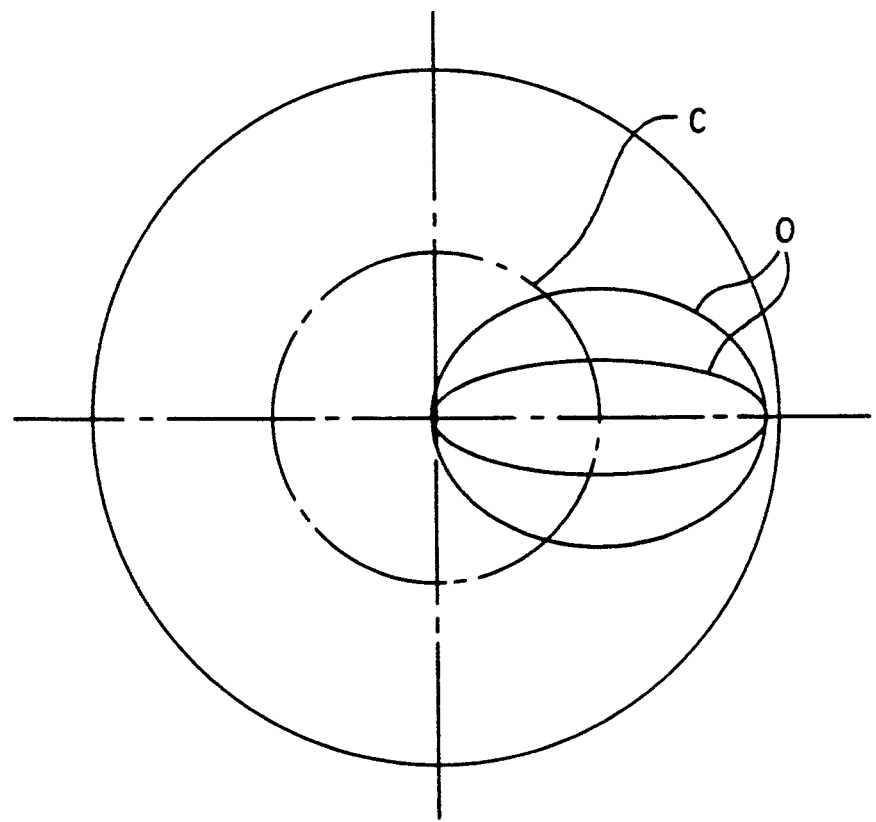
FIG. 2 is a top plan view showing the path of the spinning nozzle and the shape of the thread of glue delivered as depicted in FIG. 1.

(a) Coating the molds (FIGS. 1 and 2).

The molds are cups with their bottoms convex towards the interior (A), with a diameter of circa 150 mm. The filling height (H) is set as a function of the weight selection for each block; e.g., 0.5 kg.

The spinning nozzle (B), fed with melted hot-melt, non-pressure-sensitive adhesive is here a Meltex SK 47 fiberization nozzle, mounted on a mobile device (M) driven in a circular movement (C) centered on the axis of the mold. The movement of the nozzle is regulated such that it travels over the entire useful surface (SU) of the mold at ±1 mm from the filling height limit (H) set for filling, delivering a thread of glue, and the point of contact of which with the surface of the mold can describe circles or ovals which are flattened (O) to an extent determined by the incline of the axis M of the nozzle.

(b) Molding the block.

After the time required for the coating to take on a sufficient rigidity (at this point it is possible to separate from the mold a tenacious cap of nonsticky hot-melt adhesive), the mold is filled by pouring in melted hot-melt, pressure-sensitive adhesive up to level (H).

Figure 3:
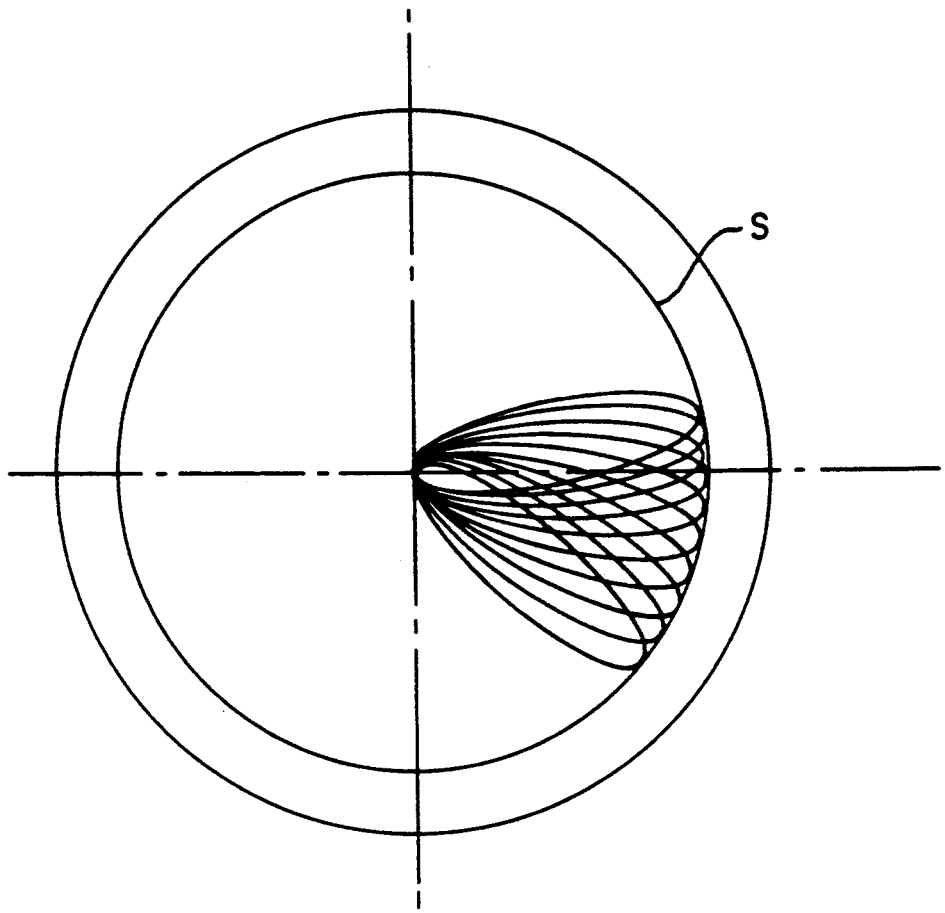
FIG. 3 is a top plan view showing the path and shape of the thread of glue delivered to the top of the molded block at hot-melt, pressure-sensitive adhesive.
Figure 4:
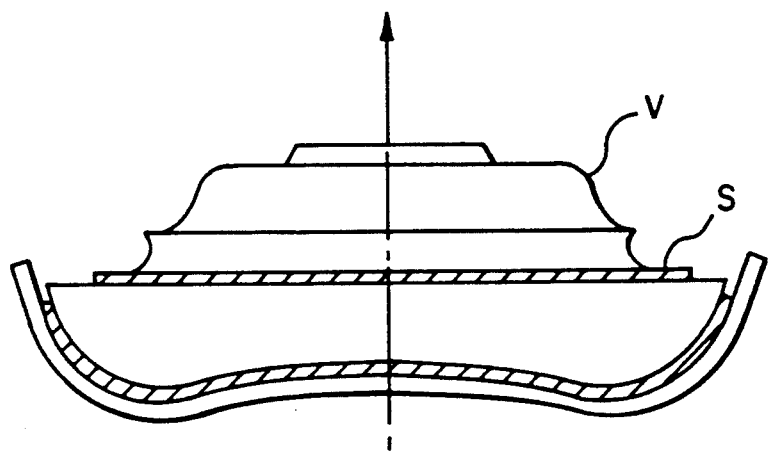
FIG. 4 is a schematic sectional side view showing the use of a suction cup to remove the molded block from the mold in accord with the present invention.

(c) Protection of the block surface and extraction (FIGS. 3 and 4).

After total cooling of the mass, the free surface is covered with a sheet of spun hot-melt, non-pressure-sensitive adhesive. To accomplish this, the periphery of the protective surface covering is limited in recess from the mold wall at circa 0.5 cm (S). The filled and surface mold is allowed to cool and then the block is extracted using a suction cup (V) the surface contact of which with the block is slightly smaller than that of the surface covered with spun hot-melt adhesive (S).

Figure 5:
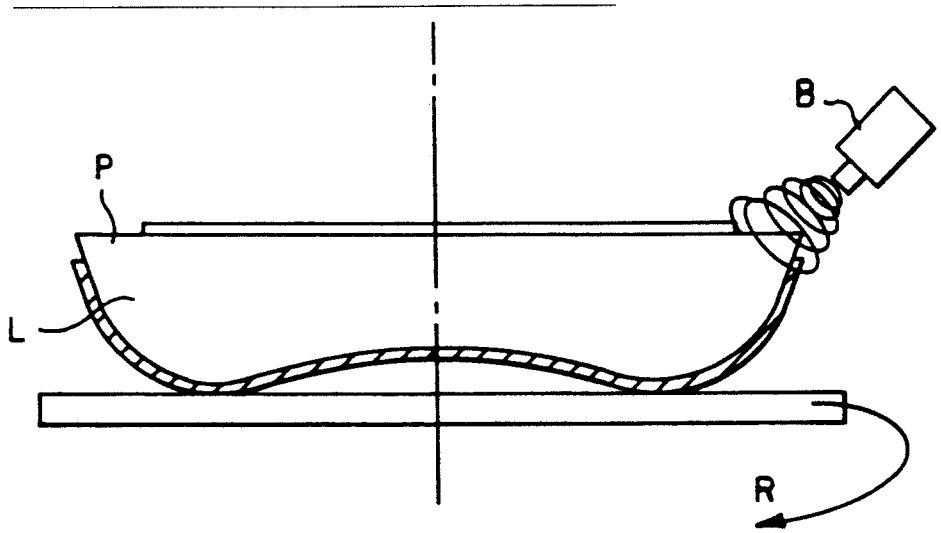
FIG. 5 is a sectional side view showing application of the web to a portion of the molded block in accord with the present invention.
Figure 6:
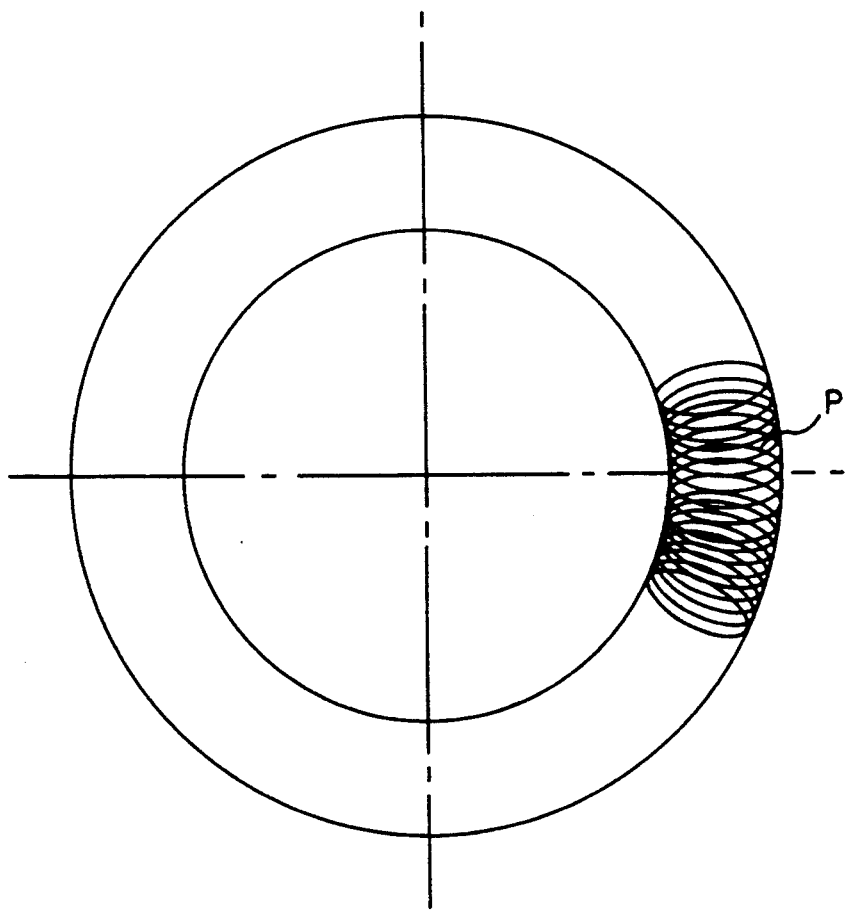
FIG. 6 is a top plan view showing the path and shape of the web of glue delivered as depicted in FIG. 5.

(d) Finishing the block (FIGS. 5 and 6).

It is now necessary to finish the protection of the resultant circular block (L) which is still sticky at the periphery (P) of its top surface at a certain distance from the edge. During the previous operations, the mold was stationary whereas the spinning nozzle was driven in a circular movement. In the following operation, the spinning nozzle positioning device is stationary and it is the block which is driven in rotational movement (R) on a turntable. The periphery (P) of the block passes under the nozzle, here the Meltex SK 34 fiberization nozzle, which is stationary after regulation of the angle of attack. Thus, a braid of hot-melt, non-pressure-sensitive adhesive is embroidered on the peripheral strip (P) that is not yet covered, which, because of the resultant elevation of the surface temperature, also has the effect of melting the excess of circa 2 mm of protective web in a sorting of stitching. The result is an absolutely protected block of pressure-sensitive adhesive, without any burns nor any zone capable of self-adhesion.

This example of the procedure according to the invention is not limitative. Notably, movements other than simply circular movements can be imposed on the nozzle, for example epicycloidal movements when the nozzle is a simple spinning nozzle. It is also possible to combine other relative movements of the nozzle and the mold or block in order to attain the result of the invention. The form of the blocks is not limited solely to cups or cylindrical cakes. It is also possible to employ spinning nozzles with multiple outlets, which have the advantage of not concentrating the non-pressure-sensitive adhesive at the center of the bottom of the block and at the center of the surface of the melting charge.

EXAMPLE 2

The procedure described in Example 1 is applied to a formulation of pressure-sensitive adhesive for palletization. The term "palletization adhesives" refers to pressure-sensitive compositions to be deposited in a very local manner on the exterior of filled sacks that are stacked on the pallets to facilitate handling and transport, notably by means of lift trucks. The problem is to avoid the sacks sliding on each other. This result is attained by depositing films of several square centimeters or several points of glue on the exterior of these sacks. Of course, the glue is selected with characteristics such that the walls of the sacks are not torn when the sacks are unstacked. A typical composition for hot-melt palletization adhesives is the following:

| | |
|---|---|
| Ethylene/vinyl acetate copolymer at 33% vinyl acetate | 17 |
| Terpene phenol resin | 15 |
| Rosin pentaerythritol ester resin | 45 |
| Dioctylphthalate | 23 |

This is a soft hot-melt adhesive whose ball and ring melting point is circa 60° C. Soft hot-melt adhesives can be defined as adhesives with a ball and ring point between 50° and 75° C. and which undergo permanent deformation under their own weight in one day. All of these soft hot-melt adhesives can only be packaged in rigid or semirigid boats (supports) or else they will deform or break when handled. Covering them with hot-melt webs in accordance with French Patent No. 2,601,616 is not effective in providing them with integrity upon handling and protecting them by powdering in accordance with French Patent No. 2,541,930 is even less effective.

Cakes formed simply with the above hot-melt adhesive can only be handled and transported in the boats in which they are molded. Their protection with a hot-melt adhesive web using the materials and conditions described in Example 3 of French Patent No. 2,601,616 is not possible since the product is torn off at the moment of extraction from its casting mold. In contrast, the cakes obtained in accordance with the invention following the operating procedure described in Example 1 above, with the same hot-melt, non-pressure-sensitive adhesive, do not flow noticeably under their own weight, they can support without sticking to each other a stack of six cakes without intercalary protective films, and they can be handled under normal conditions without excessive deformation or fragmentation and without cracking their envelope of spun hot-melt adhesive.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A process for the manufacture by casting of a block of a hot-melt, pressure-sensitive adhesive substance with an outer web lacking in stickiness or self-adhesion under weak presssure comprising spinning a web of a fiber of a hot-melt, non-pressure-sensitive adhesive substance over the interior surface of a mold at least coextensive with such interior surface as is to be filled with a molten hot-melt, pressure-sensitive adhesive substance, then casting said molten hot-melt, pressure-sensitive adhesive substance into said web-coated mold, and after cooling of said molten adhesive substance, spinning a web of a fiber of said hot-melt, non-pressure-sensitive adhesive sustance onto a portion of the free surface of said cooled adhesive substance.

2. The process of claim 1, wherein said protective web has an epicycloidal rosette structure.

3. The process of claim 2, wherein said block of hot-melt, pressure-sensitive adhesive substance with a protective web of spun hot-melt, non-pressure-sensitive adhesive substance is removed from said mold and a web of said hot-melt, non-pressure-sensitive adhesive substance spun over the edges of said block.

4. The process of claim 1, 2, or 3 wherein a fiberization nozzle is used to form the fiber and spin the webs.

* * * * *